(12) United States Patent
Son

(10) Patent No.: US 10,358,775 B2
(45) Date of Patent: Jul. 23, 2019

(54) GRASS PROTECTION MAT AND METHOD OF CONSTRUCTING THE SAME

(71) Applicants: Seo-Young Park, Seongnam-si (KR); Gyeul Son, Jocheon-eup (KR)

(72) Inventor: Chang-Sub Son, Gyeonggi-do (KR)

(73) Assignee: Seo-Young Park, Seongnam-si (KR)

( * ) Notice: Subject to any disclaimer, the term of this patent is extended or adjusted under 35 U.S.C. 154(b) by 0 days.

(21) Appl. No.: 15/921,863

(22) Filed: Mar. 15, 2018

(65) Prior Publication Data
US 2018/0266057 A1  Sep. 20, 2018

(30) Foreign Application Priority Data
Mar. 17, 2017 (KR) .................. 10-2017-0033904

(51) Int. Cl.
| E01C 9/00 | (2006.01) |
| A01G 13/02 | (2006.01) |
| E01C 5/00 | (2006.01) |
| E01C 9/08 | (2006.01) |
| A01G 13/00 | (2006.01) |
| A01G 20/00 | (2018.01) |
| A01G 9/033 | (2018.01) |

(52) U.S. Cl.
CPC .............. *E01C 9/004* (2013.01); *A01G 9/033* (2018.02); *A01G 13/00* (2013.01); *A01G 13/0268* (2013.01); *A01G 20/00* (2018.02); *E01C 5/005* (2013.01); *E01C 9/08* (2013.01); *A01G 2013/006* (2013.01); *E01C 2201/12* (2013.01); *E01C 2201/16* (2013.01)

(58) Field of Classification Search
CPC . E01C 9/004; E01C 9/08; E01C 5/005; A01G 20/00; A01G 9/033; A01G 13/00; A01G 13/0268
See application file for complete search history.

(56) References Cited

U.S. PATENT DOCUMENTS

| 3,764,446 | A | * | 10/1973 | Martin | E01C 9/086 206/304 |
| 4,111,585 | A | * | 9/1978 | Mascaro | E01C 9/004 404/70 |
| 4,584,221 | A | * | 4/1986 | Kung | E01C 13/045 404/36 |
| 5,689,912 | A | * | 11/1997 | Prestele | E01C 9/004 404/36 |
| 6,751,912 | B2 | * | 6/2004 | Stegner | E01O 5/20 52/177 |
| 7,108,454 | B2 | * | 9/2006 | Blackwood | E01C 13/083 405/36 |
| 7,201,538 | B2 | * | 4/2007 | Blackwood | E01C 13/083 404/36 |
| 7,210,876 | B2 | * | 5/2007 | Moralez | E01C 9/004 404/36 |

(Continued)

FOREIGN PATENT DOCUMENTS

| KR | 20-0413552 | 4/2006 |
| KR | 10-2009-0062723 | 6/2009 |

*Primary Examiner* — Abigail A Risic

(57) ABSTRACT

A grass protection mat that includes a plurality of bodies formed with grass passing spaces and one or more contraction-expansion compensatory connectors connecting a plurality of bodies. The grass protection mat and compensating compensates for contraction or expansion of the mat units.

5 Claims, 4 Drawing Sheets

(56) References Cited

U.S. PATENT DOCUMENTS

2007/0193133 A1\* 8/2007 Krupnick .............. B29C 70/025
52/177
2009/0208674 A1\* 8/2009 Murphy ................ E01C 13/08
428/17

\* cited by examiner

GRASS PROTECTION MAT AND METHOD OF CONSTRUCTING THE SAME

RELATED APPLICATIONS

This application claims the benefit of priority of Korean Patent Application No. 10-2017-0033904, filed on Mar. 17, 2017, the contents of which are incorporated herein by reference in their entirety.

FIELD OF THE INVENTION

The present disclosure relates to a grass protection mat and a method of constructing the same, and more particularly to a grass protection mat and a method of constructing the same, in which the mats are prevented from being expanded and uplifted at high temperature or contracted and disconnected at low temperature as the mats are expanded or contracted due to difference in temperature between summer and winter, thereby having a more improved efficiency of compensating for the contraction/expansion than that of the existing mat, and promoting growth of grass with an enlarged growth space.

BACKGROUND OF THE INVENTION

In a growth area for grass, such as a golf course, a lawn, grassplot in a park and the like, the grass present in a passage where people walk by or in a traffic line where a vehicle such as a cart in a golf course and the like passes through is repeatedly trampled down and damaged, and therefore renovation of grass is a considerable expense.

Accordingly, a grass protection mat is constructed to prevent damage of grass by distributing a load even when the grass is trampled down by people or vehicles in such a grass growth area, e.g. a traffic line area via which the people or vehicles move.

So far, a conventional known grass protection mat has been disclosed to roughly include a body forming a frame of the mat, a rug supported on the ground, a protruding pillar supporting a load, a buffering wing distributing the load, and an outer frame maintaining an outer frame of the mat.

Further, the outer frame may be provided with a hook means for connecting the mats, and an opening for coupling with the hook means of the adjacent mat. Alternatively, a bent hook may be provided in the outer frame and fitted to the outer frame of the adjacent mat to thereby connect the mats.

In case of the known grass protection mat, the mats to be constructed on the ground are connected by the hook means and the opening or by the bent hook, so that the outer frames of the mats are in close contact with each other.

Most of known grass protection mats are molded with a synthetic resin having elasticity, and therefore the mats being in close contact with each other after the construction are expanded or contracted in accordance with change in temperature.

Particularly, in summer, the mat constructed on the ground is directly exposed to sunlight and is thus likely to be terribly expanded. On the other hand, in winter, the mat constructed on the ground is likely to be contracted. In this regard, the mats are required to be in close contact with each other regardless of the ground and seasons (high or low temperature). When the mats are not harmonized with the ground, the mats are curved or moved like waves.

When the conventional grass protection mats are connected, the outer frames of the mats are in close contact with each other, and it is impossible to compensate for the expansion of the mats. Therefore, the contact portions between the mats such as the close-contact outer frames of the mats are likely to be excessively uplifted from the ground. Such uplift of the mats has been frequently problematic.

On the other hand, when the mats with the close-contact outer frames are contracted, the bodies or outer frames of the mats are pulled and it is likely to disconnect some portions of the mats.

To solve such a problem, there has been proposed a conventional grass protection mat, in which a contraction-expansion compensatory connector is used to assemble four small mat units into the grass protection mat, and the outermost outer frames of the mat are connected to other mats, thereby guiding the mats to move to compensate for the contraction and the expansion of the mat and preventing the mats from uplifting from the ground or being disconnected.

However, the above-mentioned grass protection mat, in which a plurality of mat units are connected using a predetermined compensatory connection means to compensate for the contraction-expansion of the mat units has problems that its configuration is complicated, the need of additional materials causes production to be difficult, a production cost increases, and a grass passing space becomes narrower because of the presence of the outer frame. Further, the narrow grass passing space makes a photosynthesis space be insufficient.

Further, when the outer frames of the mats are connected using the contraction-expansion compensatory connection means, an efficiency of compensating for the contraction-expansion of the mats is insufficient.

SUMMARY OF THE INVENTION

Accordingly, the present disclosure is conceived to solve the foregoing problems, and an aspect of the present disclosure is to provide a grass protection mat and a method of constructing the same, in which constructed mats are compensated for contraction or expansion to effectively prevent the close-contact mats from being uplifted or disconnected, and all or some outer frames placed between adjacent mat units are removed to thereby facilitate production and decrease costs while solving a problem of making a grass passing space and a photosynthesis space narrower due to presence of the outer frames.

In particular, there are provided a grass protection mat and a method of constructing the same, in which outer frames placed between neighboring mat units are fully or partially removed, and bodies of the neighboring mat units using no outer frames are directly connected by contraction-expansion compensatory means, thereby increasing an efficiency of compensating the contraction and the expansion of the mats, forming an elegant mat with naturally connected bodies, enlarging a grass growing space to make the grass have active photosynthesis, and reducing manufacturing and constructing costs of the mats.

Further, there are provided a grass protection mat and a method of constructing the same, in which bodies between neighboring mat units are directly connected by the contraction-expansion compensatory means without outer frames, so that a structure can be simplified to prevent a passer from falling over the mats, and the mat can be in closer-contact with the ground to prevent the mats from being curved or moving like waves.

In accordance with an embodiment of the present disclosure, a grass protection mat comprising a group of mat units includes: a plurality of bodies provided with grass passing spaces; and one or more contraction-expansion compensatory connector(s) connecting the plurality of bodies and compensating for contraction or expansion of the mat units.

Preferably, in the grass protection mat, at least four neighboring mat units may be directly connected by one or more contraction-expansion compensatory connectors and be formed as one group.

The contraction-expansion compensatory connector may be a connection plate for joining and connecting the bodies of the neighboring mat units.

The contraction-expansion compensatory connector may be connected to leave a predetermined distance between adjacent bodies.

The bodies to be connected by the contraction-expansion compensatory connector may be bodies to be in contact with outermost bodies of other neighboring mat units.

The connection plate may have a curved cross-section to make the mat be easily movable between the bodies when the mat is contracted or expanded.

The connection plate may have an upwardly-bent or annular cross-section.

In accordance with another embodiment of the present disclosure, a method of constructing a grass protection mat includes: preparing the grass protection mat comprising a plurality of mat units connected by one or more contraction-expansion compensatory connector(s) provided between bodies of the mat units; and connecting and constructing a plurality of the grass protection mats on ground, contraction and expansion of which being compensable after construction.

BRIEF DESCRIPTION OF THE SEVERAL VIEWS OF THE DRAWINGS

The above and/or other aspects of the present disclosure will become apparent and more readily appreciated from the following description of the exemplary embodiments, taken in conjunction with the accompanying drawings, in which.

DESCRIPTION OF SPECIFIC EMBODIMENTS OF THE INVENTION

Figure 1:
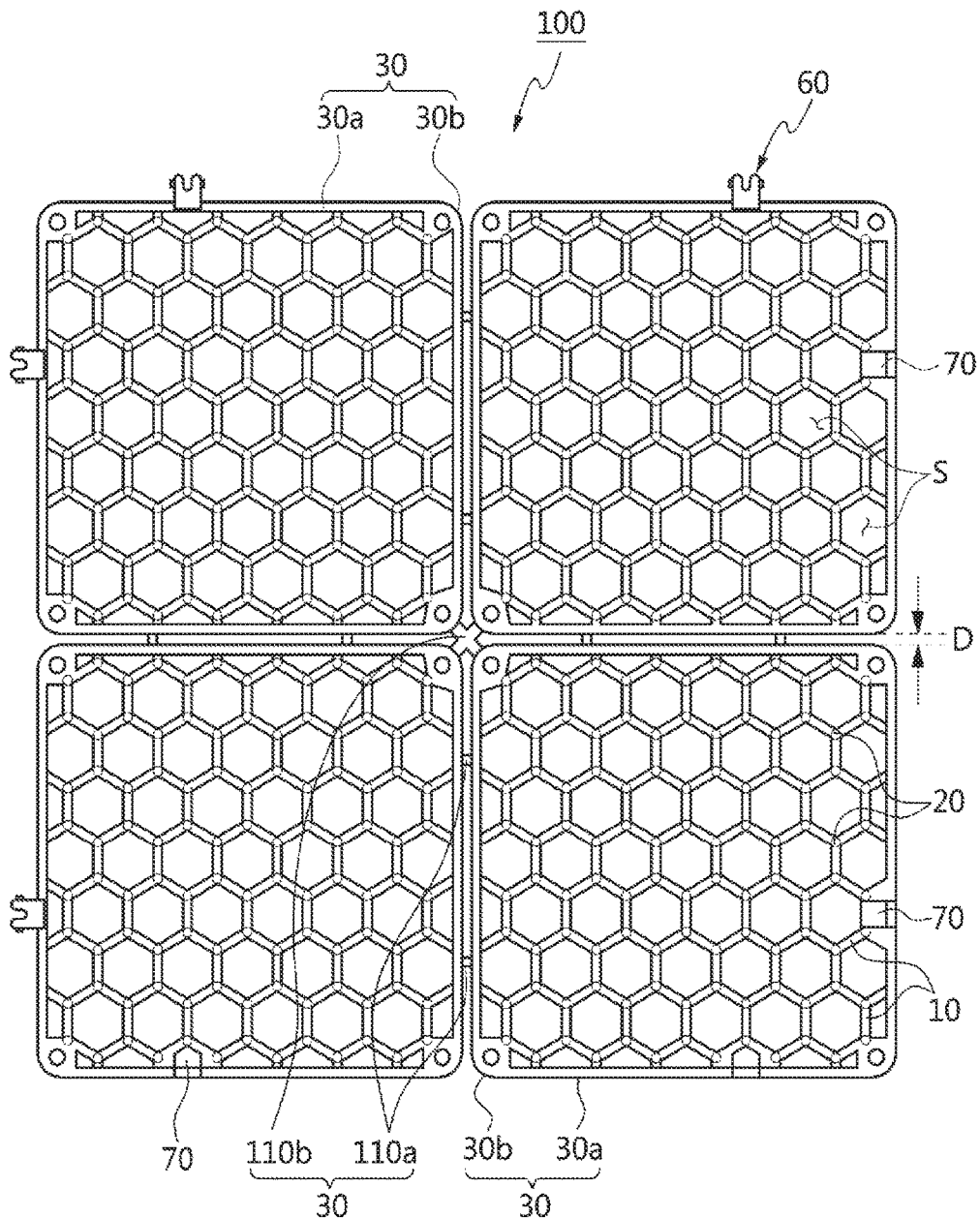
FIG. 1 is a plan view of illustrating the whole construction of a conventional grass protection mat.

Hereinafter, embodiments of the present disclosure will be described in detail with reference to the accompanying drawings to be easily realized by a person having an ordinary skill in the art to which the present disclosure pertains. However, the present disclosure may be variously implemented and not limited to the embodiments set forth herein. Further, unrelated parts are omitted in the drawings for clear description, and like elements refer to like numerals throughout the specification.

According to the present disclosure, a grass protection mat includes bodies in which grass passing spaces having a shape selected among polygonal (e.g. a hexagonal shape) or circular shapes for basically improving growth or rootage of grass are continuously connected to have a predetermined pattern.

Each grass passing space of each body has a quadrangular (diamond), triangular, octagonal, circular or the like various shapes. In accordance with ground characteristics, seasons, environments, etc. the bodies of the grass protection mat may have the same shape or different shapes. In this exemplary embodiment, the grass protection mat is manufactured to have a hexagonal body, thereby forming the grass passing spaces. However, there are no limits to the shape of the body.

Among structures for continuously connecting the grass passing spaces with one another, such a hexagonal body is advantageous to maximize the area of the grass passing space. In case of the hexagonal body, the area of the grass passing space is greater than that of another polygonal or circular body, thereby making active photosynthesis in grass.

FIG. 1 illustrates a conventional grass protection mat 100.

Referring to FIG. 1, four mat units are assembled into one grass protection mat 100.

The grass protection mat 100 shown in FIG. 1 includes bodies 10 formed by continuously connecting grass passing spaces S having a shape (e.g. a hexagonal shape) selected among polygonal and circular shapes for improving growth or rootage of grass.

Rugs 50 are provided beneath the bodies 10 of the grass protection mat 100 according to the present disclosure and support the mat.

Further, outer frames 30 for maintaining an outer appearance of the mat are integrally formed with the outer edge of the body 10, so that the outer frames can keep the shape of the mat.

Further, as shown in FIG. 1, the outer frame 30 of the grass protection mat 100 includes hook means 60 for connecting the neighboring mats, and fasteners 70 to each of which the hook means 60 of the neighboring mat is hooked.

Such structure where the neighboring mats are connected by coupling the hook means 60 and the fastener 70 of the outer frame 30 is insufficient to compensate for the contraction and expansion of the mats. In other words, the outer frames are in close contact with each other and the mats are immovable, and it is therefore impossible to move the mats and compensate for the contraction or expansion when the mats are contracted or expanded in accordance with external temperatures.

Further, as shown in FIG. 1, the grass protection mat 100 additionally includes the contraction-expansion compensatory connector 110 connected between the neighboring mat units and compensating for the contraction and expansion of the constructed mats.

FIG. 1 illustrates that the contraction-expansion compensatory connector 110 is divided into connection plates 110*a* and 110*b* respectively connected to lateral portions (i.e. excluding corner portions) and the corner portions of the outer frames of the mats.

Like this, four mats having the plurality of bodies 10 with the grass passing spaces S are grouped into one to constitute the grass protection mat 100, and integrally formed with the contraction-expansion compensatory connectors 110, i.e. the connection plates, properly arranged between the outer frames 30 of the mats, so that the contraction-expansion compensatory connectors, i.e. the connection plates 110*a* connected to the lateral portion of the outer frame and the connection plates 110*b* connected to the corners can allow the mat units to be movable as described above when the mats are excessively expanded or contracted in summer or winter.

As shown in FIG. 1, the contraction-expansion compensatory connectors 110, for example, the connection plates 110a provided between the lateral portions of the outer frames and the connection plates 110b provided at the corners of the outer frames are integrally connected between the bottoms of the outer frames of the mats while forming a distance D' between the outer frames 30 of the mats.

Therefore, when the mats are expanded or contracted, the mats can be movable within the distance D', and thus the contraction or expansion of the mats are compensated to prevent the mats from being uplifted or disconnected.

In the grass protection mat 100 of FIG. 1 as described above, the outer frames 30 between the neighboring mats are connected to each other by the contraction-expansion compensatory connector 110, and the contraction-expansion compensatory connector 110 is connected to the bottom of the outer frame 30. With this structure, the mat is movable as much as the distance formed between the outer frames 30 when the mat is expanded or contracted, thereby compensating the contraction and expansion of the mats.

However, such a grass protection mat 100 is manufactured by grouping four mat units into one and integrally injection molding the grouped one. In this regard, the outer frames have to be manufactured for every mat unit, and the contraction-expansion compensatory connectors 110 have to be additionally formed between the neighboring outer frames and between the corners of the outer frames, thereby causing an efficiency of production to be lowered and costs to be increased since the outer frames are doubly formed. Accordingly, the present inventive concept is conceived to decrease production costs and complexity as compared with those of the conventional grass protection mat. In other words, the present inventive concept is to provide a grass protection mat, in which all or some neighboring outer frames are removed between the mat units, and which includes a contraction-expansion compensatory connector for directly connecting the bodies of the mat units without the neighboring outer frames between the mat units.

Below, the grass protection mat according to the present disclosure will be described in detail with reference to FIGS. 2 to 4.

Figure 2:
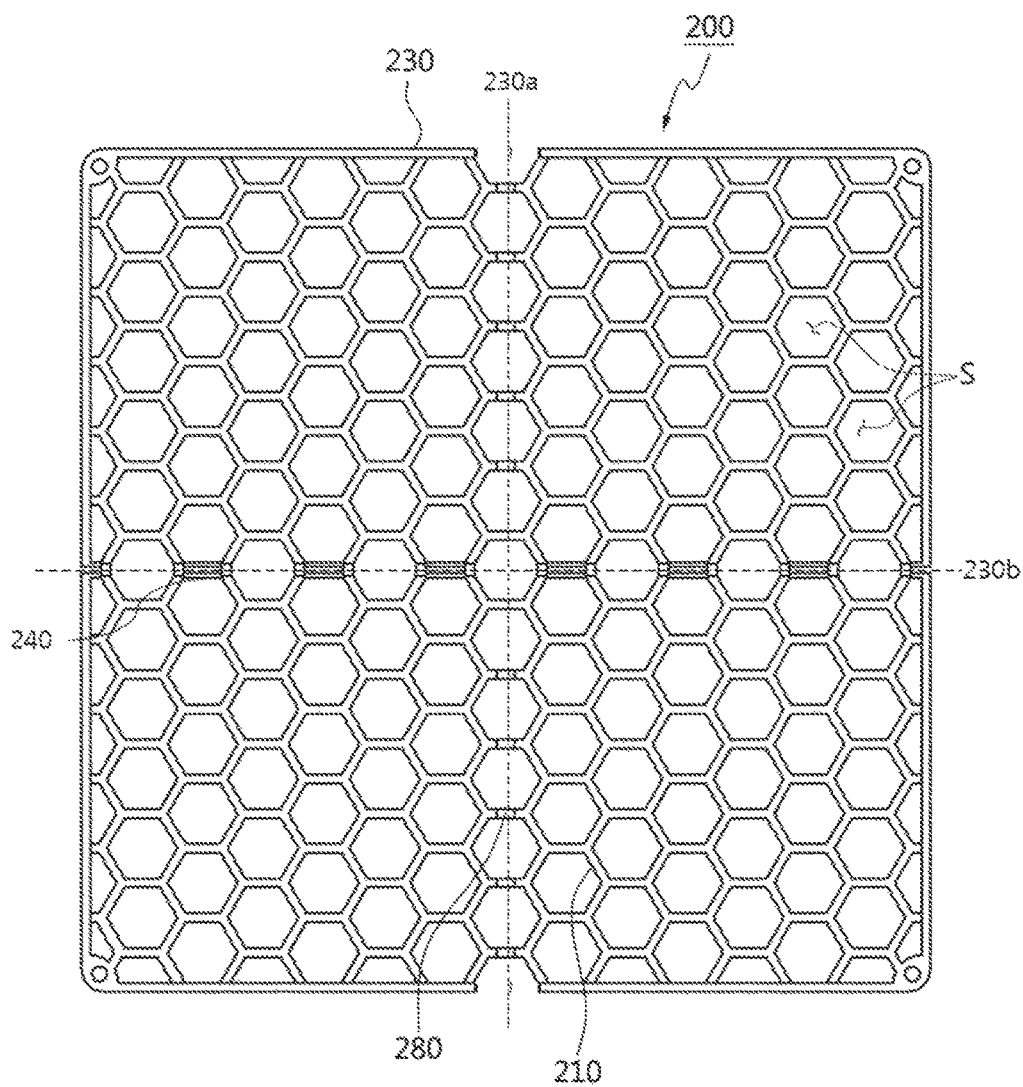
FIG. 2 is a plan view of illustrating the whole construction of a grass protection mat according to an embodiment of the present disclosure.

FIG. 2 illustrates a grass protection mat 200 according to an embodiment of the present disclosure.

Referring to FIG. 2, four mat units are assembled into one grass protection mat 200.

The body 210 shown in FIG. 2 is provided on the ground where grass grows, and forms the grass passing spaces through which the grass can photosynthesize and grow. The bodies 210 are continuously arranged and integrally connected to thereby constitute an overall frame of the grass protection mat 200.

The body 210 may have a triangular, octagonal, quadrangular (diamond) or the like polygonal or circular shape. According to this exemplary embodiment, the hexagonal shape will be described by way of example among structures for continuously connecting the grass passing spaces.

The outer frame 230 shown in FIG. 2 may be a member positioned at an outer or inner side of the grass protection mat 200 among quadrangular members of finishing the outer edges of four mat units that constitute the grass protection mat 200, and all or some outer frames 230 positioned at the inner side and adjacent to each other may be removed. That is, as shown in FIG. 2, the outer frame 230 includes a straight member positioned at a quadrisection lines or at an outer quadrangular frame on a plane.

According to an embodiment of the present disclosure, as shown in FIG. 2, the outer frames 230 constitute an overall outer quadrangle frame surrounding the mat units, and adjacent portions of the mat units are directly connected without the outer frame.

That is, the straight member as shown in FIG. 1 is not present in the neighboring portions of the mat units of the grass protection mat 200. Therefore, the grass protection mat 200 is more effective in light of production costs and time, and a contraction-expansion efficiency than the conventional grass protection mat. The grass protection mat 200 with this configuration will be described below in detail with reference to FIGS. 2 to 4.

Further, a separate fastening means may be additionally provided for connecting with other neighboring grass protection mats 200 at a specific position of an outmost edge of the grass protection mat 200.

A contraction-expansion compensatory connector 280 shown in FIG. 2 may be a member for connection between the bodies 210 of adjacent portions between the mat units in the grass protection mat 200. Specifically, the contraction-expansion compensatory connector 280 is formed for connection between one edge of the plurality of bodies 210 in one mat unit and one edge of the plurality of bodies 210 in another mat unit. Therefore, a portion to be connected by the contraction-expansion compensatory connector 280 may include the bodies 210, among the bodies 210 positioned at the outmost edge of one unit mat, which will be in contact with the bodies positioned at the outmost edge of other neighboring mat units.

In this regard, referring to FIG. 2, the bodies 210 most adjacent to the lines 230a and 230b, vertically or horizontally bisecting the whole mat, are connected by the contraction-expansion compensatory connector 280, when it is viewed on a plane. That is, unlike the structure of the grass protection mat 100 shown in FIG. 1, the bodies 210 connected by the contraction-expansion compensatory connector 280 may be directly coupled in the form of a joining pair joined to the contraction-expansion compensatory connector 280 without the outer frame.

In more detail, as shown in FIG. 2, the bodies 210 of the neighboring mats on the line 230a vertically bisecting the whole mat from a plane point of view (hereinafter, referred to as a 'vertical line') are spaced apart one another at a predetermined distance between the bodies as the outer frames are removed from the existing mats. Further, these bodies are all directly connected by the contraction-expansion compensatory connectors 280.

Therefore, two bodies of the neighboring mats and the contraction-expansion compensatory connectors positioned between them are configured to form hexagonal shapes from a plane point of view, and thus seen as if they form a single hexagonal body together. Therefore, it is possible to prevent the grass growth space from being blocked by the conventional outer frames, make scenery elegant, and secure a space for photosynthesis.

Further, as shown in FIG. 2, the bodies 210 of the neighboring mats on the line 230b horizontally bisecting the whole mat from a plane point of view (hereinafter, referred to as a 'horizontal line') are directly connected by the contraction-expansion compensatory connector 280 and configured to form a trapezoidal shape (i.e. a half-hexagonal shape) or a hexagonal shape at a portion where the bodies are adjacent to each other.

That is, the trapezoidal body adjacent to the horizontal line 230b is connected to other opposite trapezoidal body by the contraction-expansion compensatory connector 280. In addition, the hexagonal body adjacent to the horizontal line 230b may be provided with one or more support frames 240 at adjacent portions to complete the hexagonal shape. The support frame 240 may be formed as a portion remained after removing the existing outer frame 230 or extended from the body 210. Therefore, the support frame 240 may be a portion of the outer frame 230 or a portion of the body 210, or a separately formed support member may be joined or extended between the bodies 210.

The support frame 240 may be finished while maintaining the body's own polygonal shape (e.g. the hexagonal shape in this embodiment). Further, the support frame 240 is formed to have a thickness needed for maintaining the hexagonal shape. Therefore, it is preferable that the thickness of the support frame 240 is thinner than the thickness of the outer frame 230 of finishing the outer edge, thereby securing a space for photosynthesis and grass growth.

Therefore, the bodies of the neighboring mats on the horizontal line and the contraction-expansion compensatory connector positioned between them, and the bodies 210 provided with the support frame 240 are configured to form hexagonal shapes from a plane point of view, and thus seen as if they each form one hexagonal body 210.

As described above, the bodies 210 positioned on the vertical line 230a or horizontal line 230b of the mat are connected by the contraction-expansion compensatory connector 280 and also provided with the support frames, so that each body 210 can form a hexagonal shape from a plane point of view. Although the outer frames of the mat units are removed, the bodies are continuously connected and formed to have the natural hexagonal shapes, thereby forming an elegant outer appearance from the whole mat point of view, and easily securing the space for grass growth and photosynthesis.

The contraction-expansion compensatory connector 280 connects the joining pair and thus allows the mats to be movable to compensate for the contraction and extraction of the grass protection mats.

Further, the number of contraction-expansion compensatory connectors 280 is less than or equal to the number of joining pairs of the bodies to be connected by the contraction-expansion compensatory connectors 280 provided between the neighboring mats. That is, from a plan point of view, the number of contraction-expansion compensatory connectors 280 is less than or equal to the number of body pairs put on the line 230a vertically bisecting the whole mats, and is less than or equal to the number of body pairs put on the line 230b horizontally bisecting the whole mats. Therefore, the maximum number of contraction-expansion compensatory connectors 280 may be varied depending on the number of joining pairs of bodies formed in a horizontal direction 230b or a vertical direction 230a in the mats.

Figure 3:
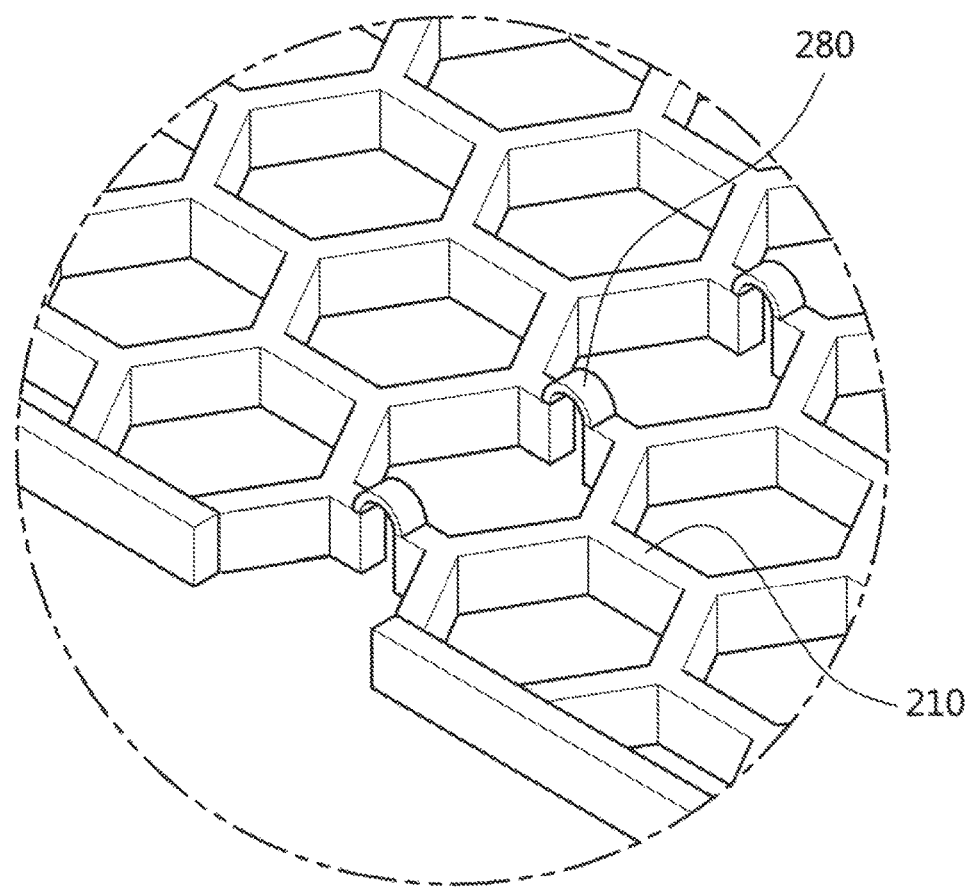
FIG. 3 is a perspective view of illustrating some contraction-expansion compensatory connectors in the grass protection mat of FIG. 2.

FIG. 3 is a perspective view showing some contraction-expansion compensatory connectors 280 in the grass protection mat of FIG. 2.

As shown in FIG. 3, in the grass protection mat 200 according to the present disclosure, the bodies in each mat unit may be directly connected to each other so as to form the joining pairs using the contraction-expansion compensatory connector 280. In particular, the contraction-expansion compensatory connector 280 of FIG. 3 may connect the neighboring bodies leaving a predetermined space between them. This is more effective in preventing the close contact portions of the mat from being disconnected or uplifted on the ground. Further, the use of the contraction-expansion compensatory connector without the existing outer frame is advantageous to secure the grass passing space.

Further, as illustratively described in above, the contraction-expansion compensatory connector 280 of the mat is a connection plate having a curved or bent cross-section, which is integrally connected between the bodies of the neighboring mats to be spaced apart at a predetermined distance to compensate for the contraction and extraction of the mat, thereby allows the mats to be movable when the mats are contracted or expanded. As described above in FIG. 2 and FIG. 3, the grass protection mat 200 according to the present disclosure minimizes thermal deformation since the bodies 210 positioned near the outer frame are injection-molded integrally with the contraction-expansion compensatory connector 280. Further, the grass protection mat 200 is integrally manufactured as one group without the outer frames between the neighboring mats, thereby simplifying the construction of the mats.

Figure 4:
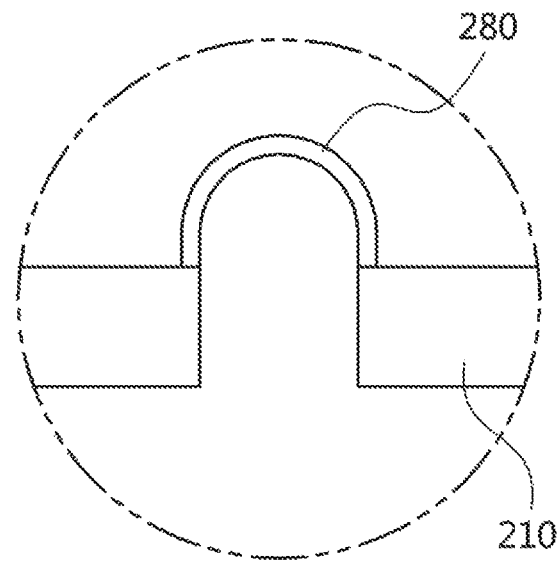
FIGS. 4 (a) and (b) are lateral cross-section views of illustrating a portion of the contraction-expansion compensatory connector in FIG. 3.
Figure 4:
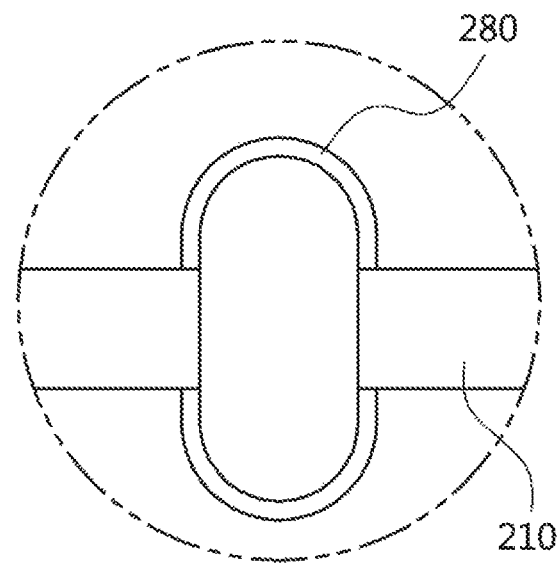

FIGS. 4 (a) and 4(b) are lateral cross-section views illustrating a portion of the contraction-expansion compensatory connector in FIG. 3.

As shown in FIG. 4, the contraction-expansion compensatory connector 280, for example a connection plate, may be formed in the form of connecting the tops of the neighboring bodies 210 of the mat units or connecting both the tops and bottoms of the neighboring bodies 210 to leave a predetermined distance for the mat contraction-expansion compensation.

FIG. 4 (a) illustrates that the contraction-expansion compensatory connector 280 connects the tops of the neighboring bodies 210 of the mat units to leave a predetermined distance for the mat contraction-expansion compensation between the adjacent bodies, and FIG. 4 (b) illustrates that the contraction-expansion compensatory connector 280 connects both the tops and bottoms of the neighboring bodies 210 of the mat units (i.e. to make the connection plates have a ring- or annular-shaped cross-section) to leave a predetermined distance for the mat contraction-expansion compensation between the adjacent bodies. With this structure, it is possible to increase the mat contraction-expansion compensatory efficiency than that of the conventional contraction-expansion compensatory connector for connecting the outer frames.

Below, a method of constructing the foregoing grass protection mat according to the present disclosure will be described.

First, as shown in FIG. 2, a plurality of, for example, four unit mats, which includes the foregoing basic elements (e.g. the body, the rug, the outer frame, etc.) are grouped into one and integrally injection-molded into the grass protection mat 200.

With this, joining pairs of bodies in the neighboring mat units are formed, and at least some joining pairs are injection-molded integrally with the contraction-expansion compensatory connectors 280, thereby connecting the bodies.

Thus, one grass protection mat 200 is formed without separate outer frames positioned at an inner side between the neighboring mat units, thereby reducing production costs and time. The bodies are directly joined and connected by the contraction-expansion compensatory connector 280 to form one grass protection mat 200 leaving a predetermined distance for the mat contraction-expansion compensation, thereby more minimizing thermal deformation of the mats than that of conventional one even when the mats are contracted or expanded after construction, and further increasing an efficiency of compensating for the contraction or expansion of the mat. In addition, although all or some outer frames positioned between the neighboring mat units are removed, the bodies are naturally connected, thereby forming an elegant appearance. Further, the grass passing space is sufficiently secured by removing the outer frame, thereby making active photosynthesis in the grass and further reducing production costs of the mats.

As described above, it is desirable that four mats are grouped into one to manufacture integrated grass protection mat 200 so that the mats can flexibly move forward, backward, leftward and rightward. However, the configuration is not limited to this.

Thus, according to the present disclosure, when the grass protection mat is constructed on a certain zone of the ground and excessively expanded or contracted after the construction, it is possible to prevent the ground-contact portions from being uplifted or disconnected. This may decrease re-construction for replacing the uplifted mats.

Meanwhile, an embodiment of the present disclosure may be implemented by the grass protection mat having various grass passing spaces.

For example, the grass protection mat may have a predetermined pattern of grass passing spaces with triangular bodies, a predetermined pattern of grass passing spaces with rectangular (diamond) bodies, or a predetermined pattern of grass passing spaces with octagonal bodies. However, the body according to the embodiment of the present disclosure is not limited to the polygonal shape, and may alternatively have a circular shape.

According to the present disclosure, when the constructed mat is contracted or expanded, it is compensated to effectively prevent the mat units being in close contact with each other from being uplifted or disconnected after the construction. In this regard, all or some outer frames positioned between the neighboring mat units are omitted, thereby facilitating the production of the mat, lowering costs, and solving the problem of narrowing the grass passing spaces due to the presence of the outer frames.

In particular, according to the present disclosure, all or some outer frames positioned between neighboring mat units are omitted, and the bodies of the neighboring mats are directly connected by the contraction-expansion compensatory means without the outer frames, thereby increasing an efficiency of the mat contraction-expansion compensatory efficiency, forming a mat having elegant appearance with naturally connected bodies, enlarging a space for the growth of the grass, making active photosynthesis in the grass, and further reducing a manufacturing costs of the mat.

Further, the bodies are directly connected by the contraction-expansion compensatory means without the outer frames between the adjacent mats, thereby having a simplified structure, preventing a passer from falling over the mats, and preventing the mats from being in closer-contact with the ground and curved or moved like waves.

Although a few exemplary embodiments of the present disclosure have been shown and described, these are for illustrative purpose only and it will be appreciated by those skilled in the art that changes may be made in these embodiments without departing from the principles and spirit of the invention, the scope of which is defined in the appended claims and their equivalents.

REFERENCE NUMERALS

200: grass protection mat
210: body
230: outer frame
280: contraction-expansion compensatory connector
S: grass passing space

What is claimed is:

1. A grass protection mat including a group of mat units, wherein the grass protection mat comprises:
a plurality of bodies formed with grass passing spaces; and one or more contraction-expansion compensatory connector(s) connecting the plurality of bodies and compensating for contraction or expansion of the mat units,
wherein at least four neighboring mat units are directly connected and formed as one group by one or more contraction-expansion compensatory connector(s),
wherein each of the contraction-expansion compensatory connector(s) is a connection plate for joining and connecting the bodies of the neighboring mats to leave a predetermined distance between adjacent bodies, and
wherein the bodies are directly connected by the contraction-expansion compensatory connector(s) and form continuous hexagonal shapes from a plane point of view.

2. The grass protection mat according to claim 1, wherein the bodies to be connected by the contraction-expansion compensatory connector are in contact with outermost bodies of other neighboring mat units.

3. The grass protection mat according to claim 1, wherein the connection plate has a curved cross-section to make the mat be easily movable between the bodies when the mat is contracted or expanded.

4. The grass protection mat according to claim 3, wherein the connection plate has an upwardly-bent or annular cross-section.

5. The grass protection mat according to claim 1, wherein the plurality of bodies are connected using the one or more contraction-expansion compensatory connectors without outer frame.

* * * * *